(12) United States Patent
Tam et al.

(10) Patent No.: US 7,728,558 B2
(45) Date of Patent: Jun. 1, 2010

(54) SYSTEMS AND METHODS FOR SELECTIVELY CHANGING CURRENT LIMIT OF A BATTERY CONTROLLER

(75) Inventors: John Tam, Los Gatos, CA (US); Timothy Johnson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 599 days.

(21) Appl. No.: 11/650,131

(22) Filed: Jan. 5, 2007

(65) Prior Publication Data

US 2008/0164855 A1 Jul. 10, 2008

(51) Int. Cl.
*H02J 7/00* (2006.01)
(52) U.S. Cl. .......................... 320/138; 320/134; 307/80
(58) Field of Classification Search ........................ None
See application file for complete search history.

(56) References Cited

U.S. PATENT DOCUMENTS

| | | | | |
|---|---|---|---|---|
| 6,396,718 | B1 * | 5/2002 | Ng et al. ................... | 363/21.07 |
| 6,972,688 | B2 * | 12/2005 | Rapaich .................... | 340/693.1 |
| 7,253,589 | B1 * | 8/2007 | Potanin et al. .............. | 320/138 |
| 2006/0015757 | A1 | 1/2006 | Tupman et al. | |

OTHER PUBLICATIONS

"Constant-Voltage/Constant-Current Battery Charger Is DAC-Controlled", Electronic Design, ED Online ID #6177, Oct. 28, 1999, copyright 2006 Penton Media, Inc., Internet article at: http//www.elecdesign.com/Articles/Print.cfm?ArticleID-6177, (4 pages.
"Li-ion/Li-Polymer Battery Charger Accepting Two Power Sources", Intersil, ISL9214, Data Sheet, Oct. 13, 2006, FN9271.0, (9 pages).

* cited by examiner

*Primary Examiner*—Edward Tso
*Assistant Examiner*—Samuel Berhanu
(74) *Attorney, Agent, or Firm*—Blakely, Sokoloff, Taylor & Zafman LLP

(57) ABSTRACT

Systems and methods for selectively changing the current threshold of current limiting circuitry are provided. The current limit threshold of current limiting circuitry may be selectively changed based on a detected power source using a resistive network. The current limiting threshold may be selected by changing a resistance value of a resistive network electrically coupled to an input on the current limiting circuitry (e.g., battery controller) for programming the current limiting threshold. The resistance value received by the currently limiting circuitry at this input may set the current threshold and thus the maximum magnitude of current that may be provided to charge a battery or other energy storage device located in the electronic device (e.g., a mobile phone).

26 Claims, 6 Drawing Sheets

SYSTEMS AND METHODS FOR SELECTIVELY CHANGING CURRENT LIMIT OF A BATTERY CONTROLLER

BACKGROUND OF THE INVENTION

This relates to personal electronic devices and more particularly to battery charging systems and methods.

Portable electronic devices, such as wireless and cellular telephones, digital media players (e.g., music players and video players), and hybrid devices that combine telephone and media playing functionality are known. These devices are typically powered by one or more batteries, which may need to be replaced or recharged.

Batteries may be recharged by providing current to the battery. The greater the magnitude of the current, the faster the battery may be charged. Known battery controllers may be used to limit the magnitude of current provided to the battery by setting a current limit threshold. A drawback of such battery controllers may be that they are limited to providing only one or two different magnitudes of charge current, and if two different magnitudes can be provided, logic circuitry may be required to select which magnitude is provided.

Accordingly, what is needed are systems and methods for selectively changing the current limiting threshold of a battery controller.

SUMMARY OF THE INVENTION

Systems and methods for selectively changing the current threshold of current limiting circuitry are provided.

The current limit threshold of current limiting circuitry may be selectively changed based on a detected power source using a resistive network. In particular, the current limiting threshold may be selected by changing a resistance value of a resistive network electrically coupled to an input on the current limiting circuitry (e.g., battery controller) for programming the current limiting threshold. The resistance value received by the currently limiting circuitry at this input may set the current threshold and thus the maximum magnitude of current that may be provided to charge a battery or other energy storage device located in the electronic device (e.g., a mobile phone).

The resistance value may be changed using a resistive network that may be electrically coupled to a battery controller and a processor. The resistive network may include resistors and at least one switch which may be connected in series with a resistor. The switch may be operative to electrically couple or decouple a resistor to the network. Thus, when the switch is closed, the network may provide a first resistance value, and when the switch is open, the network may provide a second resistance value.

The processor may control whether the switch is open or closed, depending, for example, on the detected power source. Several different power sources may be connected to an electronic device to charge the battery or batteries contained therein. These power sources may supply different levels of current. For example, when a high current power source is connected to the device, the processor may instruct the resistive network to provide a resistance value that sets the current threshold to a high threshold (to permit fast charging of the battery). When a low current power source is connected to the device, the processor may instruct the resistive network to provide a resistance value that sets the current threshold to a low threshold.

BRIEF DESCRIPTION OF THE DRAWINGS

The above and other features of the present invention, its nature and various advantages will become more apparent upon consideration of the following detailed description, taken in conjunction with the accompanying drawings, in which like reference characters refer to like parts throughout, and in which.

DETAILED DESCRIPTION OF THE INVENTION

Figure 1:
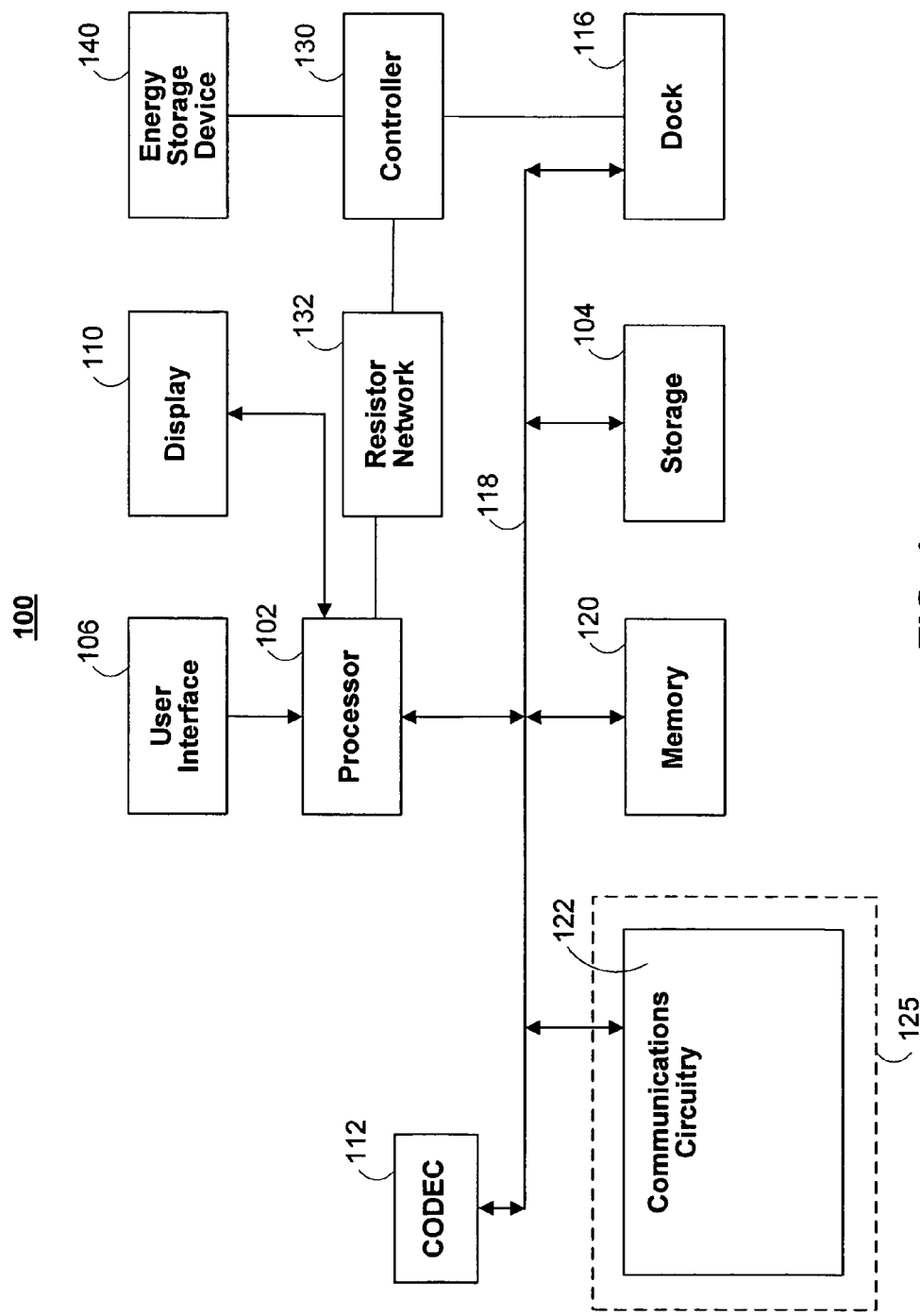
FIG. 1 shows a simplified block diagram of portable electronic device in accordance with an embodiment of the present invention.

FIG. 1 shows a simplified block diagram of illustrative portable media player 100. Media player 100 may include processor 102, storage device 104, user interface 106, display 110, CODEC 112, dock 116, bus 118, memory 120, communications circuitry 122, and power management circuitry for communications circuitry 123. Processor 102 can control the operation of many functions and other circuitry included in media player 100. Processor 102 may drive display 110 and may receive user inputs from user interface 106.

Storage device 104 may store media (e.g., music and video files), software (e.g., for implementing functions on device 100, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device to establish a wireless connection such as a telephone connection), subscription information (e.g., information that keeps tracks of podcasts or television shows or other media a user subscribes to), telephone information (e.g., telephone numbers), and any other suitable data. Storage device 104 may include one more storage mediums, including for example, a hard-drive, permanent memory such as ROM, semi-permanent memory such as RAM, or cache.

Memory 120 may include one or more different types of memory which may be used for performing device functions. For example, memory 120 may include cache, Flash, ROM, and/or RAM. Memory may be specifically dedicated to storing firmware. For example, memory may be provided for storing firmware for device applications (e.g., operating system, user interface functions, and processor functions).

Dock 116 may receive a connector that connects device 100 to another device (e.g., a computer, a cradle, or a dedicated charger). For example, dock 116 may receive a cable that can be plugged into a USB port of, for example, a computer. In another example, dock 116 may receive a cable that can be plugged into a FIREWIRE port of, for example, a charging brick. Dock 116 may be connected to bus 118 and controller 130. In some embodiments, dock 116 may be a combination data and power dock. For example, in such an embodiment, data may be transferred to and from bus 118 and power may be provided from dock 116 to controller 130. In other embodiments, dock 116 may be a power dock that is constructed to receive only power.

Bus 118 may provide a data transfer path for transferring data to, from, or between storage device 104, power management circuitry 116, communications circuitry 123, memory 120, and processor 102. Coder/decoder (CODEC) 112 may be included to convert digital audio signals into an analog signal, which may be provided to an output port (not shown).

Communications circuitry 122 may be included in a carrier circuitry portion (delimited by dashed lines 125) of device 100. Carrier circuitry portion 125 may be dedicated primarily to processing telephone functions and other wireless communications (e.g., Wi-Fi or Bluetooth). In addition, power management of carrier circuitry portion 125 may be controlled by power management circuitry 116 and/or power management circuitry 123, which may be dedicated specifically to communications circuitry 122. It is understood that the carrier circuitry portion operate independent of other device components operating in device 100. That is, carrier circuitry may be an independently operating subsystem within device 100 that may communicate with other components within device 100.

User interface 108 may allow a user to interact with the player 100. For example, the user input device 108 can take a variety of forms, such as a button, keypad, dial, a click wheel, or a touch screen. Communications circuitry 122 may include circuitry for wireless communication (e.g., short-range and/or long range communication). For example, the wireless communication circuitry may be wi-fi enabling circuitry that permits wireless communication according to one of the 802.11 standards or a private network. Other wireless network protocols standards could also be used, either in alternative to the identified protocols or in addition to the identified protocol. Another network standard may be Bluetooth.

Communications circuitry 122 may also include circuitry that enables device 100 to be electrically coupled to another device (e.g., a computer or an accessory device) and communicate with that other device. As indicated above, communications circuitry 122 may also include baseband circuitry for performing relatively long-range communications (e.g., telephone communications). If desired, communications circuitry 122 may include circuitry for supporting both relatively long-range and short-range communications. For example, communications circuitry 122 may support telephone, Wi-Fi, and Bluetooth communications.

Controller 130 may be circuitry operative to limit the magnitude of current supplied to energy storage device 140. For example, current supplied by dock 116 may be provided to controller 130, which may provide power to energy storage device 140 (e.g., a battery). Controller 130 may limit the current magnitude based on a resistance value received from resistor network 132, which may provide one of at least two different resistance values to controller 130 based on instructions received by processor 102. Energy storage device 140 may be a battery, such as a lithium-battery.

In one embodiment, player 100 may be a portable computing device dedicated to processing media, such as audio and video. For example, device 100 may be a media player (e.g., MP3 player), a game player, a remote controller, a portable communication device, a remote ordering interface, an audio tour player, or other suitable personal device. In another embodiment, player 100 may be a portable device dedicated to providing media processing and telephone functionality in single integrated unit. Device 100 may be battery-operated and highly portable so as to allow a user to listen to music, play games or video, record video or take pictures, place and take telephone calls, communicate with others, control other devices, and any combination thereof. In addition, device 100 may be sized such that it fits relatively easily into a pocket or hand of the user. By being handheld, device 100 is relatively small and easily handled and utilized by its user and thus may be taken practically anywhere the user travels.

Figure 2:
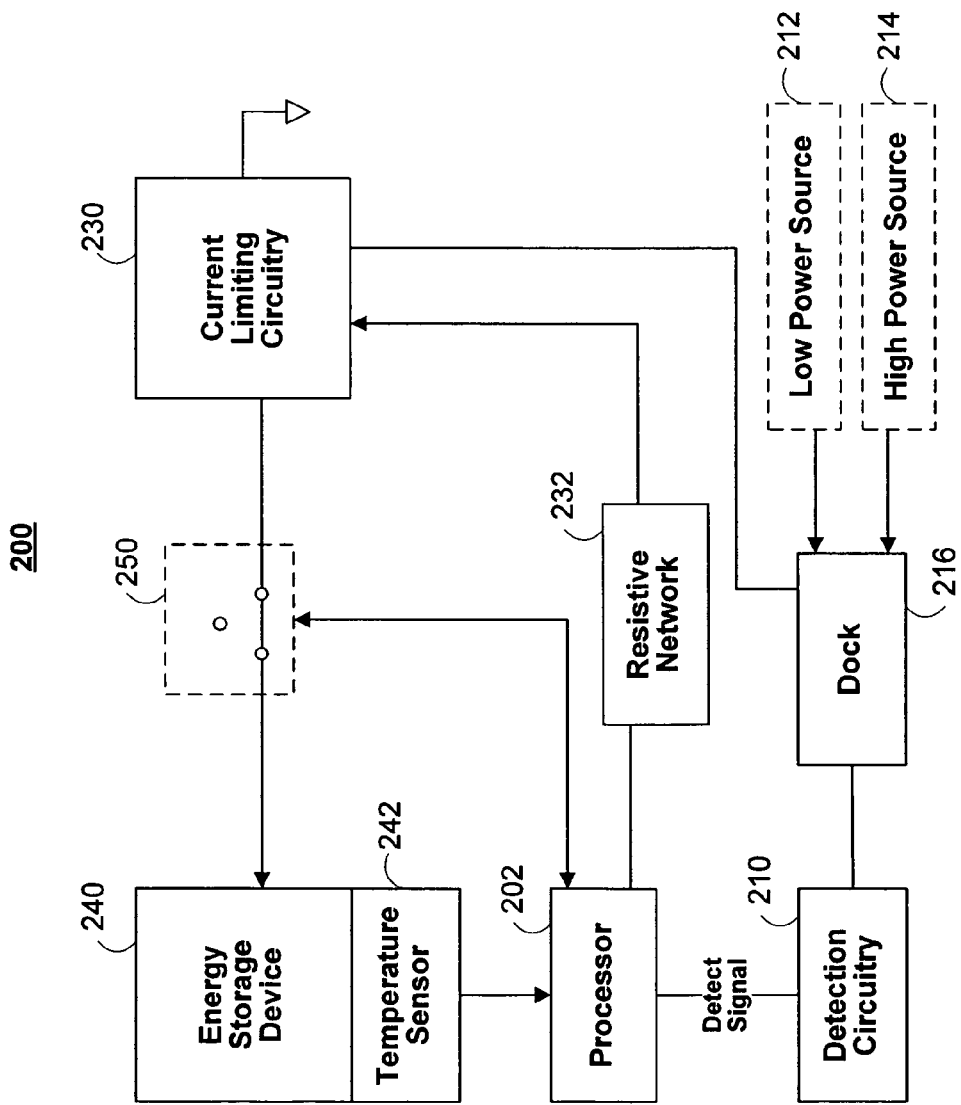
FIG. 2 shows an illustrative block diagram of circuitry that may be used to selectively change a current limit threshold of current limiting circuitry based on a detected power source using a resistive network in accordance with an embodiment of the present invention.

FIG. 2 shows an illustrative block diagram of a system that may be used to selectively change a current limit threshold of current limiting circuitry based on a detected power source using a resistive network in accordance with an embodiment of the present invention. Device 200 can include processor 202, detection circuitry 210, dock 216, current limiting circuitry 230, resistive network 232, energy storage network 240, temperature sensing circuitry 242, and switch 250. Detection circuitry 210 may generate a signal (labeled as DETECT signal) that may indicate to the processor 202 which type of power source is connected to device 200, or more particularly, dock 116, which may provide power to at least detection circuitry 210 and current limiting circuitry 230. The type of power source may be categorized based on the magnitude of current that can be provided to device 200. One category may include power sources that supply a relatively high current and another category may include power sources that supply a relatively low current. For example, in one embodiment, a high current category may include power sources that supply current greater than a predetermined current level (e.g., 500 mA) and a low current category may include power sources that supply current equal to or less than the predetermined current level (e.g., 500 mA). These two categories are illustrated as low power source 212 and high power source 214 and may be received by dock 216. In some embodiments, the low power source may be a USB port of a computer that may supply current at either 100 mA or 500 mA. In other embodiments, the high power source may be a dedicated charger (e.g., a FIREWIRE or USB brick) that may supply 1 A of current or more to device 200. It is understood that detection circuitry 210 may be designed to detect more than two categories of power sources.

Figure 3:
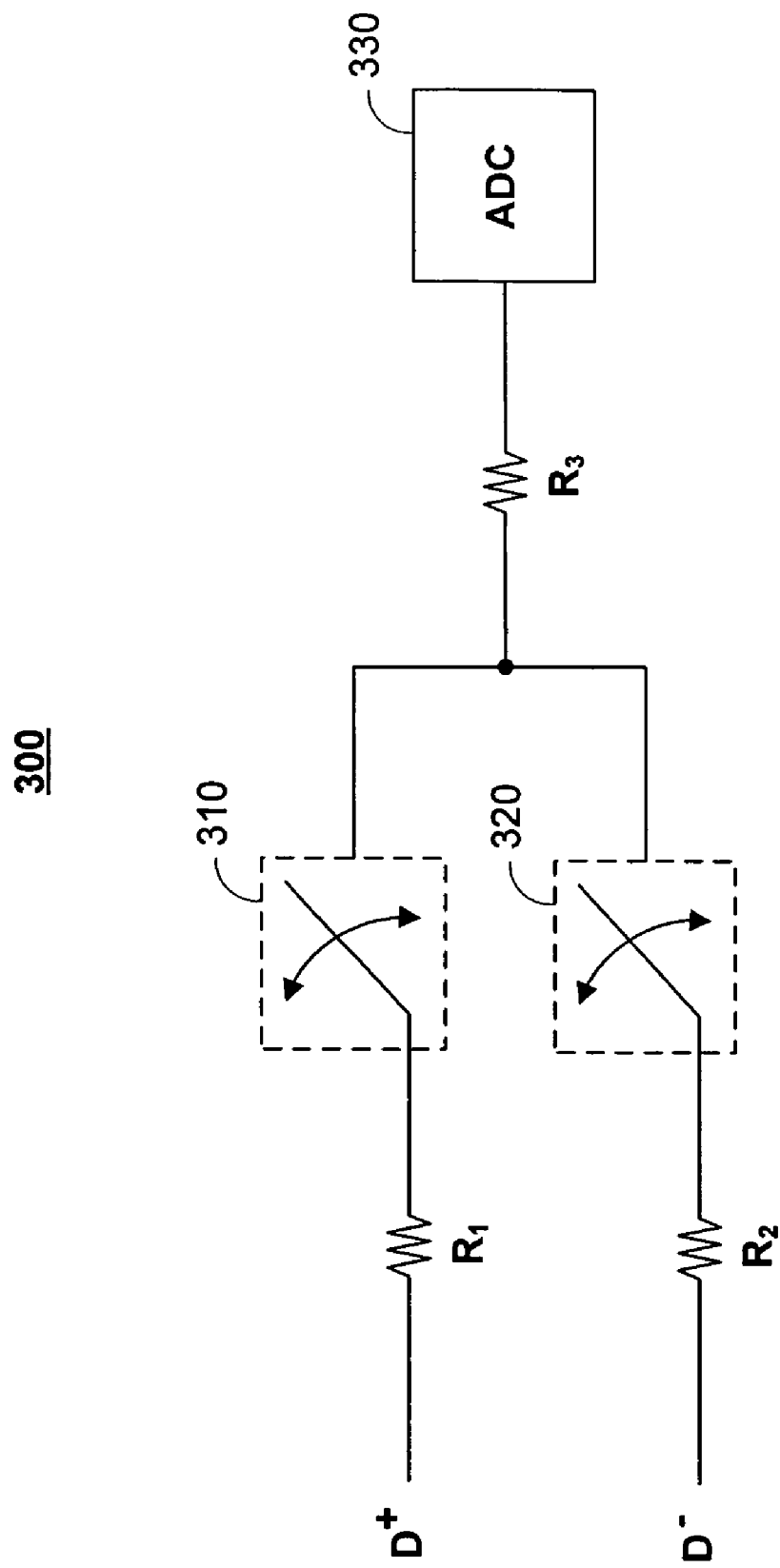
FIG. 3 shows a schematic diagram of power source detection circuitry in accordance with an embodiment of the present invention.

Detection circuitry 210 may provide a DETECT signal to processor 202, which may process the DETECT signal to determine whether a high or low power source is received by device 200. An illustrative schematic diagram of detection circuitry 210 is shown in FIG. 3. Referring now to FIG. 3, a differential signal provided by the received power source, labeled D+ and D−, is provided to detector circuitry 300. In particular, D+ is provided to resistor R1, which is connected to switch 310. D− is provided to resistor R2, which is connected to switch 320. Switches 310 and 320 are connected to resistor R3, which is connected to analog-to-digital converter 330. The resistance values of resistors R1-R3 may be such to provide protective isolation between the power source and converter 330. To determine which power source is received, converter takes two measurements. In a first measurement, the voltage on line D+ is measured when switch 310 is CLOSED and switch 320 is OPEN. In a second measurement, the voltage on line D− is measured when switch 320 is CLOSED and switch 310 is OPEN. Based on the first and second measurements, a determination can be made as to which power source is connected to the electronic device. Note that circuitry 300 may be used to detect several different power sources, including power sources capable of supplying current in excess of 1000 mA.

Note that standalone power sources such as power adapters may identify themselves by setting a predetermined voltage on D+ and D−. By comparing the measure voltage on D+ and D−, device 200 determines how much power the power source can provide. Further note, in the event device 200 is connected to a computer or USB host, a negotiation between the host and device 200 may take place to inform device 200 how much power it can draw from the host Referring now back to FIG. 3, current limiting circuitry 230 may be operative to limit the quantity of current provided to energy storage device 240 by setting a current limit threshold. For example, if the current limit threshold is set for 1 A, then current limiting circuitry 230 may supply current having a magnitude of 1 A or less to device 240. By changing the current limit threshold, the battery controller can vary the rate at which it charges a battery (e.g., the battery used to power a portable electronic device).

The current limit threshold may be changed by varying a resistance value provided to an input on circuitry 230 for programming the current limit threshold. The resistance value received by circuitry 230 at this input may set the current limit threshold and thus the maximum magnitude of current that may be provided to charge a battery or other energy storage device located in the electronic device (e.g., a mobile phone). This input may be referred to herein as a resistance based current limit threshold input. This input may be one of the pins of an "off-the-shelf" battery charger, such as LTC 4066 available from Linear Technology Inc., of Milpitas, Calif. John, which pin is it?

Although, in some embodiments, current limiting circuitry 230 may be constructed to provide one of two different current limit thresholds, additional circuitry (external to the current limiting circuitry) may be required to drive the appropriate inputs to select a desired one of those current limit thresholds. Device 200 may avoid the additional circuitry requirement to drive the appropriate inputs to select the desired current limit threshold by electrically coupling resistive network 232 to the resistance based current limit threshold input.

Figure 4:
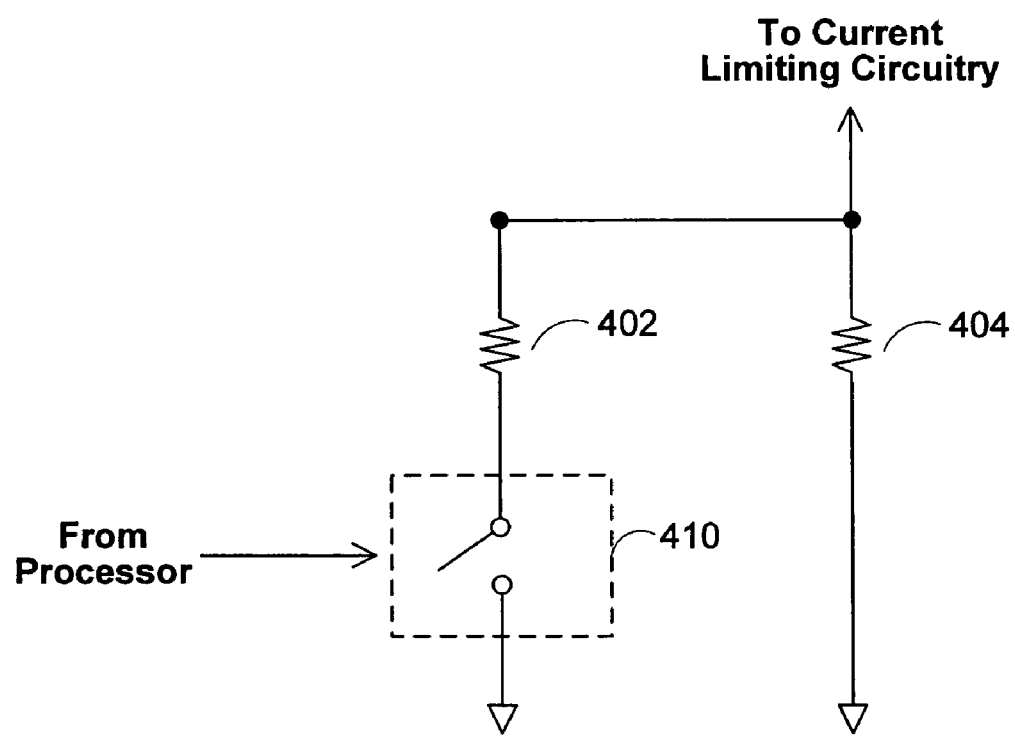
FIG. 4 shows a schematic diagram of a resistive network that can provide two different resistance values in accordance with an embodiment of the present invention.

Resistive network 232 may provide a selected resistance value based on a control signal provided by processor 202. That control signal may be based on the power source detected by detection circuitry 210. Resistive network 232 may be implement as embodiment such as that shown in FIG. 4. In FIG. 4, resistor network 400 may include resistors 402 and 404 arranged as shown and switch 410, which may be connected in series with resistor 402. Switch 410 may be operative (in response to a signal provided by processor 202) to electrically couple or decouple resistor 402 to ground. When switch 410 is closed, network 400 may provide a first resistance value (e.g., the combination of resistors 402 and 404) to the resistance based current limit threshold input. When switch 410 is open, network 400 may provide a second resistance value (e.g., resistor 404) to the resistance based current limit threshold input.

In one embodiment, current limiting circuitry 230 may set its current limit threshold to a value inversely proportional to the resistance value received at the resistance based current limit threshold input. Assuming that network 400 is used, and that high power source is detected, processor 202 may CLOSE switch 410 to reduce the overall resistance value provided by network 400 to set the current limit threshold to a high threshold. (The total resistance of two resistors in parallel is less than the resistance of any one of those resistors.) If a low power source is detected, processor 202 may OPEN switch 410 to increase the overall resistance value provided by network 400 to set the current limit threshold to a low threshold.

In another embodiment, current limiting circuitry 230 may set its current limit threshold to a value proportional to the resistance value received at the resistance based current limit threshold input. In this embodiment, processor 202 may OPEN switch 410 to set a higher current limit threshold and CLOSE switch 410 to set a lower current limit threshold.

Figure 5:
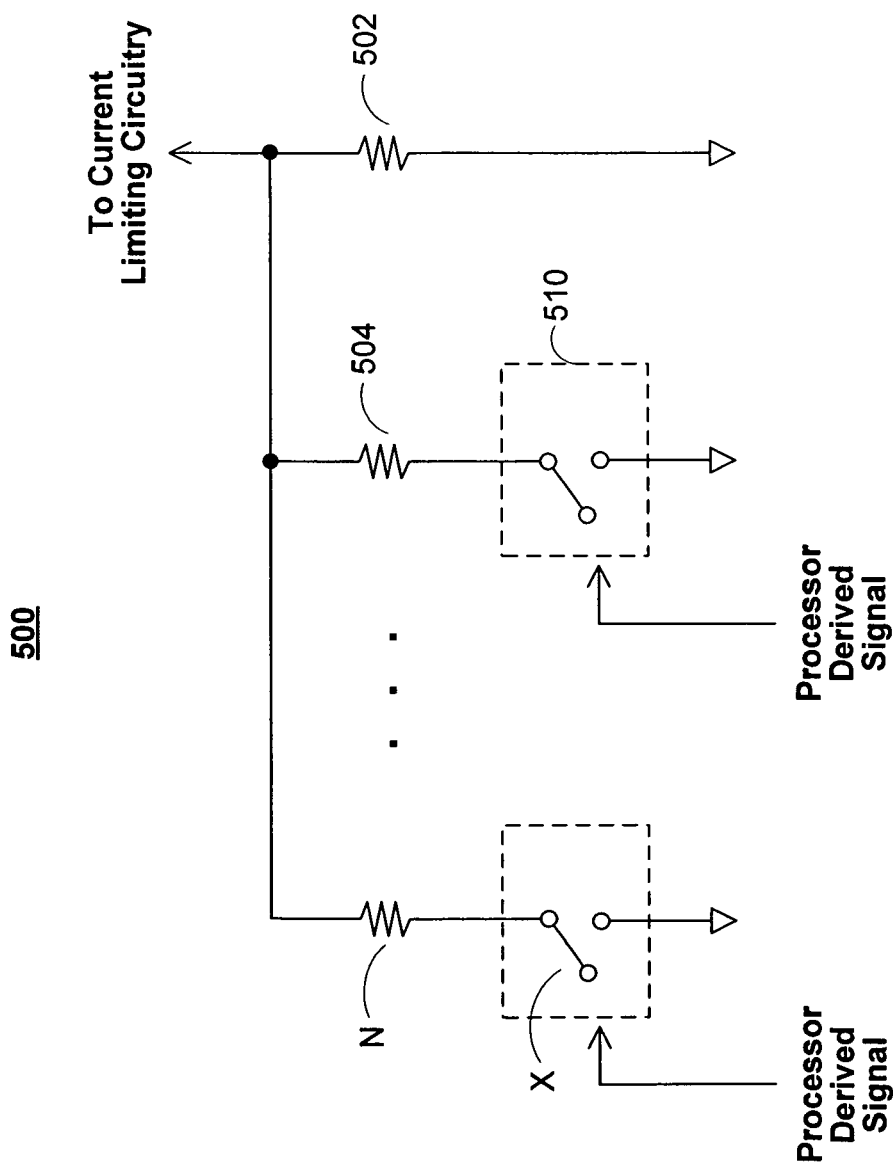
FIG. 5 shows a schematic diagram of a resistive network that can provide two or more different resistance values in accordance with an embodiment of the present invention.

Referring back to FIG. 2, it is understood that resistive network 400 may be implemented in a number of different ways, other than that illustrated in FIG. 4. For example, a resistor ladder or a variable resistor may be implemented to provide more than two different resistance values to current limiting circuitry 230. FIG. 5 shows example of resistor ladder, discussed below in more detail.

Temperature sensor 242 may monitor the temperature of energy storage device 240 and provide a temperature reading to processor 202. If the temperature reading exceeds a predetermined temperature, processor may OPEN switch 250 to prevent further charging of energy storage device 240 and a potentially hazardous overheating condition.

FIG. 5 shows an illustrative resistive network 500 that may provide two or more resistance values. As shown, network may include N number of resistors beyond resistors 502 and 504 and X number of switches beyond switch 510. Processor derived signals may independently and selectively OPEN and CLOSE each switches to provide a desired resistance value. A processor derived signal may be provided by a processor directly to a switch or by a processor indirectly to a switch. Indirectly applied signals may be conditioned by other circuitry in order to OPEN or CLOSE a given switch.

Duty cycle control of, for example, switch 410 or one or more switches in FIG. 5 may be used to exercise additional control over the resistance value received at the resistance based current limit threshold input. In duty cycle control, the processor may selectively turn the switch ON and OFF to achieve a desired resistance value.

In another embodiment, the charge current provided by the current limiting circuitry 230 can be duty cycled to adjust the current level provided to the energy storage device. For example, the received resistance value may set a baseline charging current provided by the current limiting circuitry. This baseline charging current may be reduced by a predetermined percentage by applying a duty cycle to it to obtain a target charge level. The target charge level may be calculated based on the available power provided by a power source and an estimated thermal load. The processor may set the currently limiting threshold to a baseline charge current and determine a duty cycle to "fine tune" the baseline charge current to obtain the target charge current.

In yet another embodiment, a combination duty cycle control of the charge current and the resistance value may be implemented.

Figure 6:
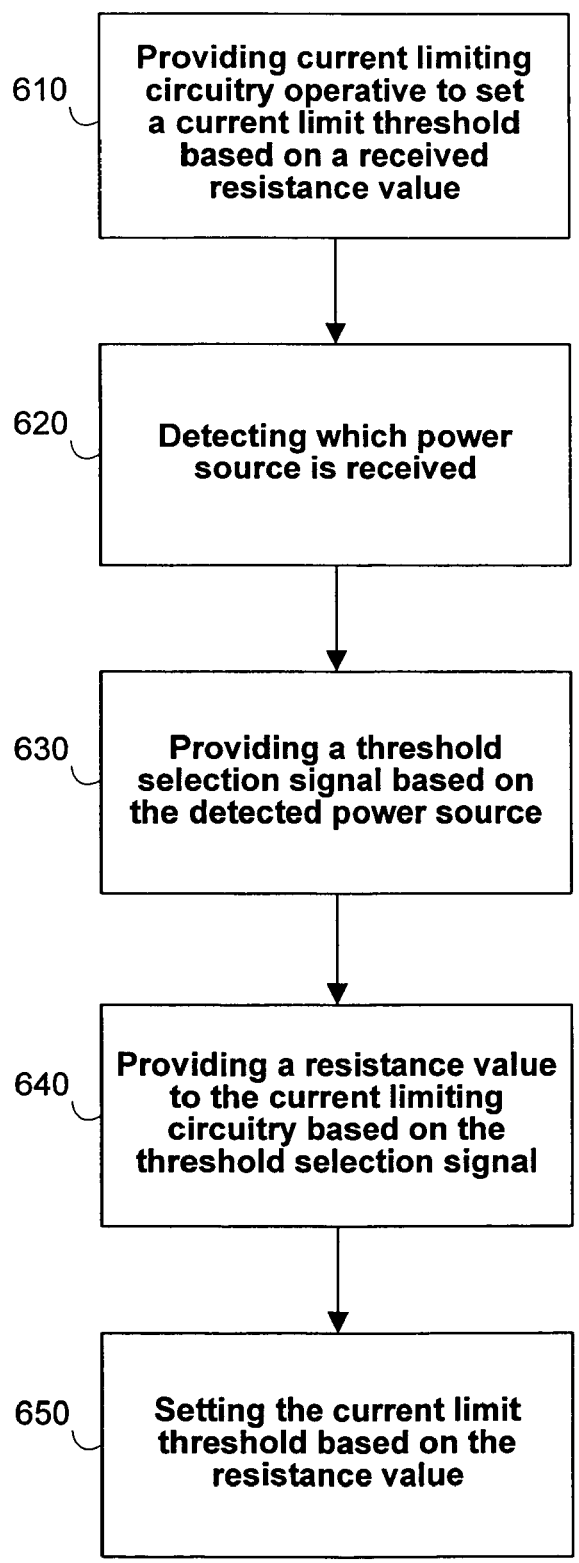
FIG. 6 shows an illustrative flowchart showing various steps to selectively change a current limit threshold of current limiting circuitry based on a detected power source using a resistive network in accordance with an embodiment of the present invention.

FIG. 6 shows an illustrative flowchart of various steps that may be taken to selectively change a current limit threshold based on a detected power source using a resistive network. At step 610, current limiting circuitry is provided that is operative to set a current limit threshold based on a received resistance value. At step 620, a determination is made as to which power source is received. The power source is detected. For example, a determination may be made that a relatively low power source is received by the electronic device. At step 630, a threshold selection signal is provided based on the detected power source. The threshold selection signal may cause the resistive network to provide a resistive value to the current limiting circuitry based on the threshold selection signal, as shown in step 640. At step 650, the current limit threshold may be set based on the resistive value provided by the resistive network.

It is understood that the steps shown in FIG. 6 are merely illustrative and that steps may be modified, added, or omitted.

Thus it is seen that the systems and method for selectively changing the current threshold of a battery controller based on a detected power source using a resistive network are provided. Those skilled in the art will appreciate that the invention can be practiced by other than the described embodiments, which are presented for purposes of illustration rather than of limitation, and the invention is limited only by the claims which follow.

What is claimed is:

1. A system for selectively changing a current limit threshold, the system comprising:
    power source detection circuitry operative to detect a power source selected from at least two power sources;
    a resistive network operative to selectively provide one of at least two resistance values based on the detected power source; and
    current limiting circuitry electrically coupled to receive the resistance value from the resistive network, the current limiting circuitry operative to set the current limiting circuitry to one of at least two current limiting thresholds based on the resistance value.

2. The system of claim 1, further comprising a dock for receiving a connector electrically coupled to one of the at least two power sources.

3. The system of claim 1, further comprising an energy storage device electrically coupled to the current limiting circuitry.

4. The system of claim 1, wherein the resistive network comprises:
    a first resistor electrically coupled to the current limiting circuitry;
    a second resistor electrically coupled to the first resistor and a ground source; and
    a switch electrically coupled between the first resistor and the ground source, the switch operative to electrically couple and decouple the first switch to the ground source based on the detected power source.

5. The system of claim 4, further comprising a processor electrically coupled to the detection circuitry and the switch, the processor operative to provide a signal to selectively turn the switch ON and OFF.

6. The system of claim 1, wherein the detection circuitry comprises:
    a first power node;
    a second power node;
    a converter;
    a first resistor electrically coupled to the first power node;
    a first switch electrically coupled to the first resistor and a third resistor, the resistor electrically coupled to the converter;
    a second resistor electrically coupled to the second power node;
    a second switch electrically coupled to the second resistor and the third resistor;
    wherein the first and second switches are selectively OPENED and CLOSED to enable the converter to measure a voltage on the first and second voltage supply nodes.

7. The system of claim 6, further comprising a processor electrically coupled to receive a signal from the converter to determine which one of the at least two power sources is received by the system.

8. A method for selectively changing a current limiting threshold, the method comprising:
    detecting a received power source selected from at least two power sources;
    selectively providing one of at least two resistance values to current limiting circuitry based on the detected power source; and
    setting the current limiting threshold to one of at least two current limiting thresholds based on the resistance value provided to the current limiting circuitry.

9. The method of claim 8, wherein selectively providing the resistance value comprises using a resistive network operative to provide one of at least two resistance values.

10. The method of claim 8, wherein detecting comprises:
    generating a first detect signal based on a power signal provided by the received power source;
    generating a second detect signal based on the power signal provided by the received power source; and
    analyzing the first and second detect signals to detect which power source is received.

11. The method of claim 8, wherein the detected power source is a high power source and the resistance value is set to a value that sets the current limiting threshold to a high current limiting threshold.

12. The method of claim 8, wherein the detected power source is a low power source and the resistance value is set to a value that sets the current limiting threshold to a low current limiting threshold.

13. The method of claim 8, further comprising:
    receiving power, at the current limiting circuitry, from the power source; and
    limiting a magnitude of the power outputted by the current limiting circuitry based on the current limiting threshold.

14. The method of claim 13, further comprising:
    providing the power having the limited magnitude to an energy storage device.

15. The method of claim 14, further comprising:
    adjusting the resistance value using duty cycle control.

16. The method of claim 14, further comprising:
    providing a charging current based on the current limit threshold set for the current limiting circuitry; and
    adjusting the charging current using duty cycle control.

17. A portable electronic device, comprising:
    a processor operative to generate at least one selection signal based on a detected power source;
    a resistive network electrically coupled to the processor, the network operative to provide one of at least two resistance values in response to the at least one selection signal; and
    battery controller circuitry electrically coupled to the resistive network to receive the resistance value and operative to provide a power signal, the power signal having a magnitude limited to a current limiting threshold based on the resistance value, the battery controller circuit operative to set the current limiting threshold to one of at least two current limiting thresholds based on the resistance value.

18. The portable electronic device of claim 17, wherein the resistive network comprises:
    a first resistor electrically coupled to the battery contoller circuitry;
    a second resistor electrically coupled to the first resistor and a ground source; and
    a switch electrically coupled between the first resistor and the ground source, the switch operative to electrically couple and decouple the first resistor to the ground source in response to the at least one signal provided by the processor.

19. The portable electronic device of claim 17, wherein the resistive network comprises:

a variable resistor electrically coupled to the battery controller circuitry and the processor.

20. The portable electronic device of claim 17, wherein the resistive network comprises:

a resistor ladder electrically coupled to the battery controller circuitry and the processor.

21. The portable electronic device of claim 17, wherein the threshold is inversely proportional to the resistance value provided to the battery controller circuitry.

22. The portable electronic device of claim 17, wherein the threshold is proportional to the resistance value provided to the battery controller circuitry.

23. The portable electronic device of claim 17, wherein the electronic device is a mobile telephone or a personal media device.

24. The portable electronic device of claim 17, wherein the detected power source is USB power source.

25. The portable electronic device of claim 17, wherein the detected power source is a FIRE WIRE power source.

26. The portable electronic device of claim 17, wherein the detected power source is selected from the group of power sources capable of supplying 100 mA, 500 mA, 1000 mA, or any combination thereof.

* * * * *

UNITED STATES PATENT AND TRADEMARK OFFICE
CERTIFICATE OF CORRECTION

| | | |
|---|---|---|
| PATENT NO. | : 7,728,558 B2 | |
| APPLICATION NO. | : 11/650131 | |
| DATED | : June 1, 2010 | |
| INVENTOR(S) | : John Tam et al. | |

It is certified that error appears in the above-identified patent and that said Letters Patent is hereby corrected as shown below:

In column 5, line 10, after "host" insert -- . --.

In column 8, line 62, in Claim 18, delete "contoller" and insert -- controller --, therefor.

Signed and Sealed this
Twenty-fifth Day of October, 2011

David J. Kappos
*Director of the United States Patent and Trademark Office*